United States Patent
Sarsilmaz et al.

(10) Patent No.: US 11,129,236 B1
(45) Date of Patent: Sep. 21, 2021

(54) CONTROL OF MULTIAGENT SYSTEMS WITH LOCAL AND GLOBAL OBJECTIVES

(71) Applicants: Selahattin Burak Sarsilmaz, Tampa, FL (US); Tansel Yucelen, Tampa, FL (US)

(72) Inventors: Selahattin Burak Sarsilmaz, Tampa, FL (US); Tansel Yucelen, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/530,326

(22) Filed: Aug. 2, 2019

Related U.S. Application Data (60) Provisional application No. 62/739,998, filed on Oct. 2, 2018.

(51) Int. Cl.
  *H04W 84/18* (2009.01)
  *G06F 16/901* (2019.01)
  *H04W 24/02* (2009.01)
  *G06F 17/11* (2006.01)

(52) U.S. Cl.
  CPC ........ *H04W 84/18* (2013.01); *G06F 16/9024* (2019.01); *G06F 17/11* (2013.01); *H04W 24/02* (2013.01)

(58) Field of Classification Search
  None
  See application file for complete search history.

(56) References Cited

U.S. PATENT DOCUMENTS

| | | | | |
|---|---|---|---|---|
| 6,263,358 B1* | 7/2001 | Lee | ............... | G06F 8/458 718/100 |
| 6,266,805 B1* | 7/2001 | Nwana | ............... | G06F 9/4862 714/35 |
| 6,314,555 B1* | 11/2001 | Ndumu | ............... | G06F 8/10 706/49 |
| 6,842,899 B2* | 1/2005 | Moody | ............... | G06F 9/4875 718/100 |
| 9,419,854 B1* | 8/2016 | Wang | ............... | H04L 41/0654 |
| 9,720,795 B2* | 8/2017 | Faraj | ............... | G06F 11/3428 |
| 2003/0149714 A1* | 8/2003 | Casati | ............... | G06Q 10/10 718/100 |

(Continued)

FOREIGN PATENT DOCUMENTS

CN 102130503 A 7/2011

OTHER PUBLICATIONS

Kubota, et al., "Intelligent Control of a Multi-Agent System based on Multi-Objective Behavior Coordination," 2007 International Symposium on Computational Intelligence in Robotics and Automation, Jacksonville, FL 2007, pp. 184-189.

(Continued)

*Primary Examiner* — Kenny S Lin
(74) *Attorney, Agent, or Firm* — Thomas | Horstemeyer, LLP (57) ABSTRACT

Disclosed is a multiagent system having multiple agents in communication with each other via a communication network. The agents can be tasked with performing a global objective. At least a subset of the agents can also be tasked with performing a local objective in addition to the global objective. Performance of the local objective can occur without deteriorating performance of the global objective.

20 Claims, 4 Drawing Sheets

(56) References Cited

U.S. PATENT DOCUMENTS

2005/0005272 A1\* 1/2005 Moody ............... G06Q 10/06
718/104
2006/0117295 A1\* 6/2006 Wu ............... G05B 19/41885
717/104

OTHER PUBLICATIONS

Su, et al, "Distributed Synchronization Control of Multi-Agent Systems with Switching Directed communication Topologies and Unknown Nonlinearities", 2015 54th IEEE Conference on Decision and Control (CDC), Osaka, 2015, pp. 5444-5449.
Lunze, J., "Synchronization of Heterogeneous Agents,": in IEEE Transactions on Automatic Control, vol. 57, No. 11, pp. 2885-2890, Nov. 2012.
R. Olfati-Saber and R. M. Murray, "Consensus problems in networks of agents with switching topology and time-delays," IEEE Transactions on Automatic Control, vol. 49, No. 9, pp. 1520-1533, 2004.
T. Yucelen and M. Egerstedt, "Control of multiagent systems under persistent disturbances," in American Control Conference, 2012.
G. D. L. Torre and T. Yucelen, "Adaptive architectures for resilient control of networked multiagent systems in the presence of misbehaving agents," International Journal of Control, vol. 91, No. 3, pp. 495-507, 2018.
W. Ren and R. W. Beard, "Consensus seeking in multiagent systems under dynamically changing interaction topologies," IEEE Transactions on Automatic Control, vol. 50, No. 5, pp. 655-661, 2005.
C. W. Wu, "Agreement and consensus problems in groups of autonomous agents with linear dynamics," in IEEE International Symposium on Circuits and Systems, 2005.
H. F. Grip, T. Yang, A. Saberi, and A. A. Stoorvogel, "Output synchronization for heterogeneous networks of non-introspective agents," Automatica, vol. 48, No. 10, pp. 2444-2453, 2012.

\* cited by examiner

AVAILABLE INFORMATION TYPES TO EACH AGENT

| | A | B | C | D | E | F | Information |
|---|---|---|---|---|---|---|---|
| Protocol | 1 – 5 | 1, 3, 5 | 1, 3, 5 | 1, 3, 5 | | | $x_{rj}(t) - x_{ri}(t)$ |
| | | 2, 4 | | | | | $x_j(t) - x_{ri}(t)$ |
| | | | 2, 4 | | | | $x_{rj}(t) - x_i(t)$ |
| | | 1 – 3 | | 2, 4 | | | $x_j(t) - x_i(t)$ |
| | | | | | 4, 5 | 3, 5 | $x_{ri}(t) - x_i(t)$ |

FIG. 3

ASSUMPTIONS AND PROPERTIES OF THE PROTOCOLS

| Protocol | U | V | W | X | Y | Z |
|---|---|---|---|---|---|---|
| 1 | ✗ | ✗ | ✓ | ✗ | ✗ | ✗ |
| 2 | ✓ | ✓ | ✗ | ✗ | ✗ | ✗ |
| 3 | ✓ | ✗ | ✓ | ✓ | ✗ | ✗ |
| 4 | ✓ | ✓ | ✗ | ✗ | ✓ | ✓ |
| 5 | ✓ | ✗ | ✓ | ✓ | ✓ | ✓ |

CONTROL OF MULTIAGENT SYSTEMS WITH LOCAL AND GLOBAL OBJECTIVES

CROSS-REFERENCE TO RELATED APPLICATIONS

This application claims benefit of U.S. Provisional Application No. 62/739,998, filed Oct. 2, 2018, which is hereby incorporated herein by reference in its entirety.

GOVERNMENT LICENSE RIGHTS

This invention was made with government support under Grant Number CMMI1657637 awarded by the National Science Foundation. The Government has certain rights in the invention.

BACKGROUND

A multiagent system is a system of multiple interacting agents that can be used to perform tasks for solving a problem. The multiagent system can controlled via a centralized controller in direct communication with each of the agents or through a distributed control environment.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

With the system-theoretic advancements in distributed control of multiagent systems, groups of agents are able to utilize local interactions for achieving a broad class of prescribed global objectives. On the other hand, several agents forming the multiagent system are still expected to perform their own local objectives while they simultaneously achieve a given global objective. As such, it is beneficial to have distributed control methods with analytic foundations that offer an effective remedy to this problem. The present disclosure presents several distributed control solutions with comparable advantages, where all these control solutions allow a subset of agents to perform their local objectives without deteriorating the overall multiagent system's global objective.

The present disclosure relates to controlling multiagent systems with local and global objectives. A multiagent system of the present disclosure comprises comprising multiple agents configured to communicate with and interact with each other via a directed communication graph topology. An agent can comprise a computer system configured to perform one or more tasks. An agent can comprise aerial vehicles, ground vehicles, autonomous vehicles, electrical vehicles, power systems industrial process control (e.g., robotic assembly lines, etc.), and/or other types of systems that have individual tasks but are in communication with each other. According to various embodiment's, each agent can have a local and global objective to carry out.

As an example, multiple agents can work together to perform a task referred to as a global objective. Each agent has certain responsibilities, or local objectives, to take care of to complete the task. In some instances the local objective of an agent may be altered. The agents can communicate while performing the local objectives to ensure successful completion of the global objective simultaneously with the local objectives. The agents can communicate via a graph topology, such as, for example, a fixed and directed communication graph topology. According to one embodiment, the fixed and directed communication graph topology can be defined as $\mathcal{G}$ (V,E). V={$v_1, \ldots, v_N$} is a nonempty finite set of N nodes and E⊂V×V is a set of edges. The agents can correspond to $v_1, \ldots, v_N$.

Multiagent systems can include groups of agents that locally interact through a graph topology. The systems can achieve a broad class of prescribed global objectives that range from benchmark consensus and consensus-like objectives to leader-follower and containment objectives, to name but a few examples. It would be helpful to have a model that can provide for several agents forming the multiagent system to perform their own local objectives while they simultaneously achieve a given global objective. From a practical standpoint, an agent is expected to perform a set of local objectives autonomously or objectives that are assigned through an operator in addition to purely obeying to the global objective of the multiagent system. Yet, current distributed control methods with analytic foundations do not offer an effective remedy to this problem.

Figure 1:
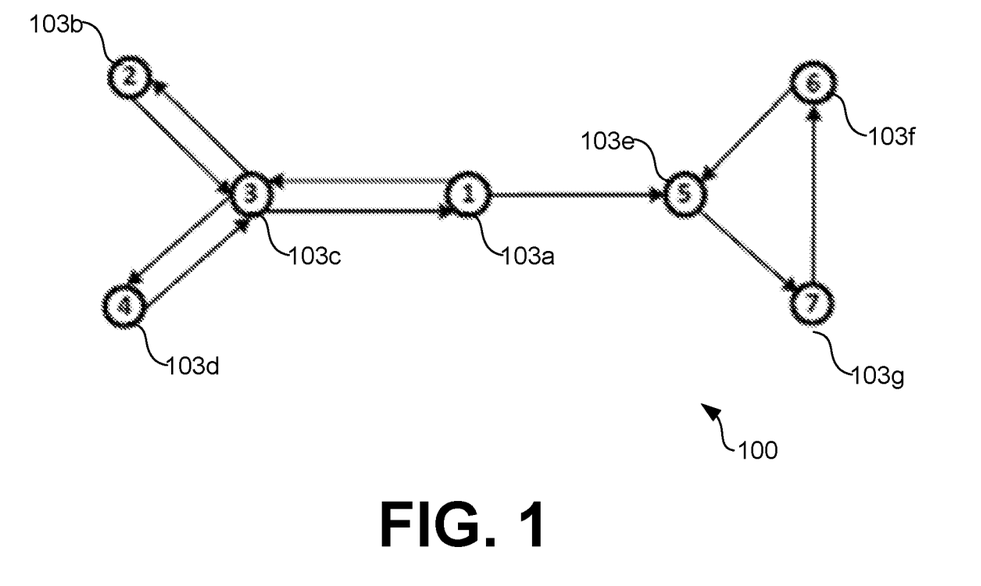
FIG. 1 is an example multiagent system with circles denoting the agents and arrows donating the edges of the directed and connected graph topology according to various example embodiments.

To elucidate the challenge in this problem, consider an example multiagent system 100 shown in FIG. 1. The multiagent system 100 of FIG. 1 includes multiple agents 103 (e.g., 103a, 103b, 103c, 103d, 103e, 103f, 103g) in communication with each other via a communication system defined by a graph topology. In particular, assume that this system 100 has been performing a global consensus objective and an operator wants to interact with the middle agent 100a in order to drive it to an information-rich environment for data collection purposes. When an operator starts injecting commands to the actuators of an agent 103 for the mentioned purpose, the interaction can deteriorate the global consensus objective of this multiagent system 100 in that the agreement point drifts from the original agreement point. One remedy to this problem may be to remove the middle agent 103a from the graph topology in FIG. 1 so that it can be freely controlled by the operator. However, removing this agent 103 results in a disconnected multiagent system 100 and prevents the accomplishment of the global objective. In general, removing agents 103 from the multiagent system 100 requires considerable knowledge of the graph topology in order to avoid such cases.

The present disclosure describes five different distributed control solutions with comparable advantages. A system-theoretic stability analysis is provided for each proposed distributed control method, where all these methods allow a subset of agents to perform their local objectives without deteriorating global objective of the overall multiagent system. Although the benchmark consensus problem can be used as the global objective, this is without loss of generality in the sense that the presented distributed control methods can be extended to other global objectives including, e.g., consensus-like, leader-follower, and containment objectives.

Mathematical Preliminaries
Notation and Graph Theoretic Preliminaries

In respect to notation and graph theoretic preliminaries, the following standard notations are used in this disclosure. In particular, $\mathbb{R}$, $\mathbb{R}_{>0}$, and $\mathbb{R}_{\neq 0}$ respectively denote the sets of real, positive real, and non-zero real numbers; $\mathbb{R}^n$ and $\mathbb{R}^{n \times m}$ respectively denote the sets of n×1 real column vectors and n×m real matrices; $1_n$ denotes the n×1 vector of all ones; and "≜" denotes equality by definition. The symbol |•| is written for the absolute value of a number in $\mathbb{R}$.

Graph theoretical notation is adopted. A fixed (e.g., time-invariant) directed graph $\mathcal{G}$ (V,E) is considered where V={$v_1, \ldots, v_N$} is a nonempty finite set of N nodes, and E⊂V×V is a set of edges. Each node in V can correspond to an agent. There is an edge rooted at node $v_j$ that ended at $v_i$, (i.e., ($v_j,v_i$)∈E), if and only if $v_i$ receives information from $v_j$. In addition, A=[$a_{ij}$]∈$\mathbb{R}^{n \times n}$ denotes the adjacency matrix, which describes the graph structure; that is $a_{ij}>0 \Leftrightarrow$ ($v_j,v_i$)∈E and $a_{ij}=0$ otherwise. According to some embodiments, repeated edges and self-loops are not allowed; that is, $a_{ii}=0$, $\forall i \in \mathcal{N}$ with $\mathcal{N}$ ={1, ..., N}. The set of neighbors of node $v_i$ can be denoted as $N_i$={j∈V|($v_j,v_i$)∈E}. In-degree and Laplacian matrices are defined as D=diag ($d_1, \ldots, d_N$) with $d_i=\Sigma_{j \in N_i} a_{ij}$ and L=D−A, respectively. Thus, L has zero row sums (i.e., $L1_N=0$). A directed path from node $v_i$ to node $v_j$ is a sequence of successive edges in the form {($v_i, v_p$), ($v_p,v_q$), ..., ($v_r, v_j$)}. A directed graph is said to have a spanning tree if there is a root node that has directed paths to all other nodes in the graph. A directed graph is strongly connected if there is a directed path between every ordered pair of distinct nodes. Thus, all nodes are root nodes if the graph is strongly connected.

Consensus with Single Integrator Agents

A benchmark consensus problem of single integrator agents 103 is discussed herein. A sufficient condition of this solution is that $\mathcal{G}$ is strongly connected owing to Theorem 1 in R. Olfati-Saber and R. M. Murray, "Consensus problems in network of agents with switching topology and time-delays," IEEE Transaction in Automatic Control, vol. 49, no. 9, pp. 1520-1533, 2004, which is hereby incorporated by reference in its entirety, that the rank property of directed graphs. The desired rank property of directed graphs (rank(L)=N−1) can be still obtained under a weaker condition, G having a spanning tree. (see, e.g., W. Ren and R. W. Beard, "Consensus seeking in multiagent systems under dynamically changing interaction topologies," IEEE Transactions on Automatic Control, vol. 50, no. 5, pp. 655-661, (2005)). In fact, it is a necessary condition to solve the consensus problem.

Consider the dynamics of each agent 103

$$\dot{x}_i(t)=u_i(t), x_i(0)=x_{i0}, t \geq 0, \qquad (1)$$

with state $x_i(t) \in \mathbb{R}$ and input $u_i(t) \in \mathbb{R}$. Every agent 103 uses the distributed control algorithm given by $$u_i(t)=\Sigma_{j \in N_i} a_{ij}(x_j(t)-x_i(t)). \qquad (2)$$

By letting $x(t) \triangleq [x_1(t), \ldots, x_N(t)]^T$, the closed-loop dynamics involving all agents 103 can now be written as $$\dot{x}(t)=-Lx(t), x(0)=x_0, t \geq 0. \qquad (3)$$

Lemma 1: The algorithm in Equation (2) solves the consensus problem of the single integrator agents 103 in Equation (1) if and only if the directed graph has a spanning tree. Furthermore, the consensus value $\bar{x}$ (i.e. $\lim_{t \to \infty} x_i(t) = \bar{x}$, $\forall i \in \mathcal{N}$ is given by $\bar{x} = w_l^T x_0$, where $w_l^T L = 0$ and $w_l^T 1_N = 1$.

For some embodiments, useful lemmas on convergence can be presented. Specifically, the following lemma can be started with that provides a sufficient condition for boundedness of a piecewise continuous real function on [0,∞).

Lemma 2: Suppose f is a piecewise continuous real function on [0,∞). If $\lim_{t \to \infty} f(t)=h$ (i.e., h is finite), then f is bounded.

Consider the dynamical system given by $$\dot{\xi}(t)=-\alpha \xi(t)+\beta \eta(t), \xi(0)=\xi_0, t \geq 0, \qquad (4)$$

where $\alpha \in \mathbb{R}_{>0}$, $\beta \in \mathbb{R}_{\neq 0}$, $\xi(t) \in \mathbb{R}$ is the state and $\eta(t) \in \mathbb{R}$ is the piecewise continuous input.

Lemma 3: If $\lim_{t \to \infty} \eta(t)=0$, then $\lim_{t \to \infty} \xi(t)=0$. The dynamical system of the form can be considered as:

$$\dot{\xi}(t)=-\alpha \xi(t)+\beta \eta(t)+\omega(t), \xi(0)=\xi_0, t \geq 0, \qquad (5)$$

where $\xi(t)\in\mathbb{R}$ is the state and $\omega(t)\in\mathbb{R}$ is the piecewise continuous disturbance.

Lemma 4: If $\lim_{t\to\infty}\omega(t)=0$, then $\lim_{t\to\infty}(\xi(t)-\hat{\xi}(t))=0$. If, in addition, $\eta(t)=\eta^*$ ($\eta^*$ is finite), then $\lim_{t\to\infty}\xi(t)=(\beta/\alpha)\eta^*$ Remark 1: According to Lemma 4, $\beta/\alpha$ can be regarded as the static (e.g., DC) gain of the dynamical system in Equation (5).

Problem Statement
Global and Local Objectives

According to various embodiments, the multiagent system 100 of N single integrator agents 103 comprises a fixed and directed communication graph topology $\mathcal{G}$. In addition, the multiagent system 100 is subject to both global and local objectives. Specifically, the global objective achieves consensus through local interactions and the local objectives relate to the local tasks assigned to a subset of agents 103 (e.g., driving an agent 103 of the multiagent system 100 to an environment for data collection or battery charging purposes).

Now, let $\mathcal{N}_p$ (respectively, $\mathcal{N}_{p'}$) denote the set of agents 103 that can (respectively, cannot) be assigned to local tasks. The harmony of the global and local objectives of the multiagent system plays a crucial role in this problem. Hence, the algorithms proposed to solve this problem should take into account the following points. First, agents that perform their local objectives (i.e., $\mathcal{N}_p$) do not deteriorate the global objective of remaining agents (i.e., $\mathcal{N}_{p'}$); that is, $\lim_{t\to\infty}x_i(t)=x^*$, $\forall i\in\mathcal{N}_{p'}$, where $x^*\in\mathbb{R}$ is a consensus value. Second, agents that complete their local tasks (i.e., $\mathcal{N}_p$) still obey the global objective of the multiagent system; that is, $\lim_{t\to\infty}\theta_i(t)=0$, $\forall i\in\mathcal{N}_p$ implies $\lim_{t\to\infty}x_i(t)=x^*$, $\forall i\in\mathcal{N}_p$, where $\theta_i(t)\in\mathbb{R}$ is a piecewise continuous input used to assign local tasks.

Remark 2. Although in the second point it is considered that all agents with local tasks complete them, it is clear from the proofs of Theorems 1-5 that even if some agents do not complete them, the remaining agents 103 in $\mathcal{N}_p$ obey the global objective of the multiagent system. In other words, if $\lim_{t\to\infty}\theta_m(t)\neq 0$ or this limit does not exist for all $m\in\hat{\mathcal{N}}_{p,p}$, where $\hat{\mathcal{N}}_p\subset\mathcal{N}_p$, then $\lim_{t\to\infty}x_i(t)=x^*$, $\forall i\in\mathcal{N}_p\dagger\hat{\mathcal{N}}_p$ provided that $\lim_{t\to\infty}\theta_i(t)=0$, $\forall i\in\mathcal{N}_p\dagger\hat{\mathcal{N}}_p$.

All five distributed control architectures (hereinafter referred to as protocols) utilize the following assumptions:

Assumption 1. The directed graph $\mathcal{G}$ is fixed and has a spanning tree.

Assumption 2. The roles of agents 103 are fixed.

Remark 3. Assumption 1 is required since Lemma 1 is used in the below protocols. Assumption 2 implies that $\mathcal{N}_p$ and $\mathcal{N}_{p'}$ do not change in time. Thus, without loss of generality, the index sets $\mathcal{N}_p=\{1,\ldots,p\}$ and $\mathcal{N}_{p'}=\{p+1,\ldots,N\}$ are assumed in the present disclosure.

Protocols

The five different protocols of the present disclosure can ensure the harmony of the global and local objectives of the multiagent system 100. While these protocols have the same goal, each protocol differs from the others in many ways such as assumptions, exchanged information, and flexibility to choose a desired consensus value (see FIGS. 3 and 4).

First Protocol

For the first protocol based on Lemma 1, the following reference (i.e. virtual) consensus model should be considered for each agent 103

$$\dot{x}_{ri}(t)=\Sigma_{j\in N_i}a_{ij}(x_{rj}(t)-x_{ri}(t)), x_{ri}(0)=x_{ri0}, t\geq 0. \quad (6)$$

By letting $x_r(t)\triangleq[x_{r1}(t),\ldots,x_{rN}(t)]^T\in\mathbb{R}^N$, the dynamics of all reference consensus models can be written as $$\dot{x}_r(t)=-Lx_r(t), x_r(0)=x_{r0}, t\geq 0. \quad (7)$$

The first protocol is now given by $$u_i(t)=\sum_{j\in N_i}a_{ij}(x_{rj}(t)-x_{ri}(t))+k_i\left(\theta_i(t)+\sum_{j\in N_i\backslash N_p}a_{ij}(x_j(t)-x_i(t))\right), \quad (8)$$

where $k_i>\mathbb{R}_{>0}$ if $i\in\mathcal{N}_p$, $k_i=0$ otherwise.

In Equation (8), the first summation assumes that all agents 103 can exchange the relative information about their internal states (i.e., states of their reference models). The second summation presumes that each agent 103 has access to the relative state error for all $j\in N_i\backslash\mathcal{N}_p$. Owing to the definition of $k_i$, the second summation is effective only when the agent belongs to $\mathcal{N}_p$.

Define now the error between the state of each agent and the state of its corresponding reference consensus model as $$\tilde{x}_i(t)\triangleq x_i(t)-x_{ri}(t). \quad (9)$$

Inserting Equation (8) into Equation (1) and using Equation (6), the following error dynamics are obtained from Equation (9) as $$\dot{\tilde{x}}_i(t)=k_i\left(\theta_i(t)+\sum_{j\in N_i\backslash N_p}a_{ij}(\tilde{x}_j(t)-\tilde{x}_i(t)+x_{rj}(t)-x_{ri}(t))\right), \quad (10)$$

$$\tilde{x}_i(0)=\tilde{x}_{i0}, t\geq 0,$$

The first protocol in Equation (8) also can enforce Assumptions 3 and 4.

Assumption 3. Each agent 103 $i\in\mathcal{N}_p$ receives information from at least one agent 103 $j\in\mathcal{N}_{p'}$.

Assumption 4. For all $i\in\mathcal{N}_{p'}$, one sets $x_{ri0}=x_{i0}$.

Remark 4. Let $d_{pi}\triangleq\Sigma_{j\in N_i\backslash\mathcal{N}_p}a_{ij}$ be the another in-degree for each agent $i\in\mathcal{N}_p$. Thus, Assumption 3 implies that $d_{pi}>0$, $\forall i\in\mathcal{N}_p$. Here, these assumptions are not necessary to solve the problem stated herein; specifically, Assumption 4 is only used for the first protocol, and Assumption 3 is not required in the fourth and the fifth protocol. Stated below is one of the results of the present disclosure.

Theorem 1. Let Assumptions 1, 2, and 4 hold. Then, protocol in Equation (8) guarantees that $$\lim_{t\to\infty}x_i(t)=x_r, \forall i\in\mathcal{N}_{p'},$$

where $$x_r=w_1^T x_{r0}.$$

If, in addition, Assumption 3 holds and $$\lim_{t\to\infty}\theta_i(t)=0, \forall i\in\mathcal{N}_p,$$

then $$\lim_{t\to\infty} x_i(t) = x_r, \forall i \in \mathcal{N}_p.$$

When operators assign local tasks (i.e. inject commands) to the agents 103 in $\mathcal{N}_p$, they can utilize the following corollary that presents the inherent static gain $1/d_{pi}$ of the error dynamics of agents 103 in $\mathcal{N}_p$. It is also noted that this static gain depends on the graph topology.

Corollary 1. If $\theta_i(t) \equiv \theta_i^*$ ($\theta_i^*$ is finite), $\forall i \in \mathcal{N}_p$ in Theorem 1, then $$\lim_{t\to\infty} x_i(t) = x_r + \left(\frac{1}{d_{pi}}\right)\theta_i^*, \forall i \in \mathcal{N}_p.$$

Figure 2:
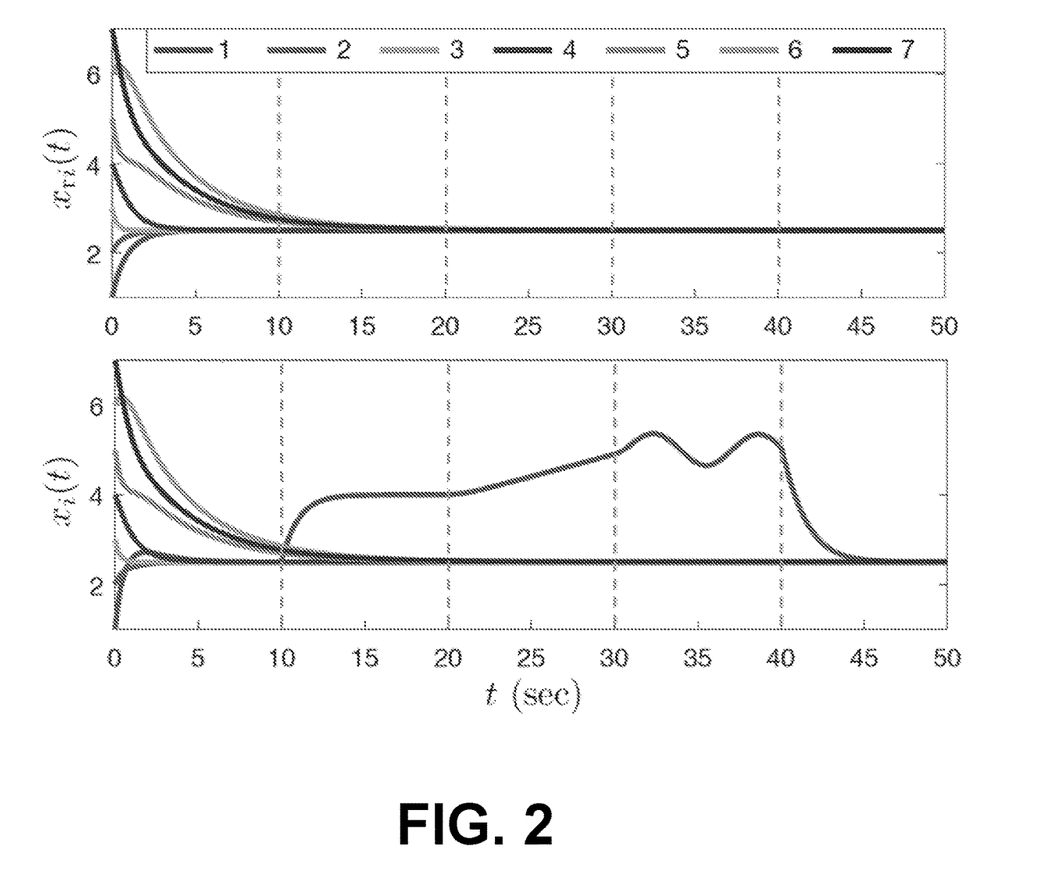
FIG. 2 illustrates a graph of responses of agents and reference consensus models corresponding to the agents for the multiagent system of FIG. 1 according to various example embodiments.

Remark 5. Revisiting the motivating scenario with the graph given by FIG. 1, $\mathcal{N}_p = \{1\}$ and $\mathcal{N}_{p^-} = \{2, \ldots, 7\}$. To elucidate the above results on this scenario, consider the following numerical setup. Each nonzero $a_{ij}$ can be set to 1 and $k_1=1$. Furthermore, all initial conditions of the agents 103 and their corresponding reference consensus models are chosen such that $x_{ri0} = x_{i0} = i$, $\forall i \in \mathcal{N}$. FIG. 2 shows the results with the first protocol. In particular, FIG. 2 illustrates a graphical representation of the responses of the agents 103 and their corresponding reference consensus modes for the multiagent system 103 of FIG. 1. The middle agent's 103a state $x_1(t)$ responds to the injected command $\theta_1(t)$ given in this figure for performing a local objective, where the overall multiagent system's 100 global consensus objective is not deteriorated.

In FIG. 2, $\theta_1(t)=0$ for $t\in[0,10)$, $\theta_1(t)=1.5$ for $t\in[10,20)$, $\theta_1(t)=3.5$ for $t\in[20,30)$, $\theta_1(t)=0$ for $t\in[30, \infty)$ is a command injected to the middle agent 103a for the purpose of influencing its behavior to perform a local objective (i.e., driving $x_1(t)$ to different spatial points). Agents 103 eventually converge to $\bar{x}_r=2.5$.

Note that Assumption 4 may not strictly hold in practical applications due to initialization errors. To this end, the following result removes this assumption to illustrate the deviation of agents 103 from the desired consensus value $\bar{x}_r$.

Corollary 2. Let Assumptions 1 and 2 hold. Then, protocol in Equation (8) provides that $\lim_{t\to\infty} x_i(t) = \bar{x}_r + \tilde{x}_{i0}$, $\forall i \in \mathcal{N}_{p^-}$. If, in addition, Assumption 3 holds and $\lim_{t\to\infty} \theta_i(t) = 0$, $\forall i \in \mathcal{N}_p$, then $\lim_{t\to\infty} x_i(t) = \bar{x}_r + (1/d_{pi})\Sigma_{j\in N_i\cap\mathcal{N}_p} a_{ij}\tilde{x}_{j0}$, $\forall i \in \mathcal{N}_p$.

Second Protocol

In the second protocol, the reference consensus model is used only for agents in $\mathcal{N}_p$ to eliminate the need for Assumption 4 and to reduce the order of protocols for agents in $\mathcal{N}_{p^-}$. In particular, let $q(t) \triangleq [x_{r1}(t), \ldots, x_{rp}(t), x_{p+1}(t), \ldots, x_N(t)]^T \in \mathbb{R}^N$, where the first p state variables of $q(t)$ are the states of reference consensus models for agents in $\mathcal{N}_p$, and the remaining state variables of $q(t)$ represent the states of agents in $\mathcal{N}_{p^-}$ (this definition uses Assumption 2). Consider the following reference consensus model for each agent $i\in \mathcal{N}_p$ $$\dot{x}_{ri}(t) = \sum_{j\in N_i} a_{ij}(q_j(t) - q_i(t)) = \sum_{j\in N_i} a_{ij}(q_j(t) - x_{ri}(t)), \quad (11)$$

$$x_{ri}(0) = x_{ri0}, \quad t \geq 0$$

The second protocol now has the form given by $$u_i(t) = \sum_{j\in N_i} a_{ij}(q_j(t) - q_i(t)) + k_i\left(\theta_i(t) + \sum_{j\in N_i\setminus N_p} a_{ij}(x_j(t) - x_i(t))\right). \quad (12)$$

Note that the first summation in Equation (12) differs from the one in Equation (8). Specifically, if $i\in\mathcal{N}_p$, $(q_j(t)-q_i(t))$ can denote $(x_{rj}(t)-x_{ri}(t))$ or $(x_j(t)-x_{ri}(t))$ and if $i\in\mathcal{N}_{p^-}$, it can denote $(x_{rj}(t)-x_{ri}(t))$ or $(x_j(t)-x_i(t))$. Thus, agents are allowed to exchange additional types of information. Next, insert Equation (12) into Equation (1). Each agent if $i\in\mathcal{N}_{p^-}$ then has the dynamics given by $$\dot{x}_i(t) = \sum_{j\in N_i} a_{ij}(q_j(t) - q_i(t)), \quad x_i(0) = x_{i0}, \quad t \geq 0.$$

Noticing that the definition in Equation (9) is only applicable to agents in $\mathcal{N}_p$ using Equation (11), and observing $x_j(t) = q_j(t)$ if $j\in\mathcal{N}_{p^-}$, the error dynamics of each agent $i\in\mathcal{N}_p$ can be written as $$\dot{\tilde{x}}_i(t) = k_i\left(\theta_i(t) + \sum_{j\in N_i\setminus N_p} a_{ij}(-\tilde{x}_i(t) + q_j(t) - q_i(t))\right), \quad (14)$$

$$\tilde{x}_i(0) = \tilde{x}_{i0}, \quad t \geq 0.$$

When Equations (11) and (13) are considered together, the following aggregated dynamics arises $$\dot{q}(t) = Lq(t), q(0) = q_0, t \geq 0. \quad (15)$$

Except some of the state variables, the system in Equation (15) is nothing but the system in Equation (7). Now, by utilizing the second protocol, the following theorem addresses the two points addressed above: i) agents that perform their local objectives do not deteriorate the global objective of remaining agents and ii) agents that complete their local tasks still obey the global objective of the multiagent system 100.

Theorem 2. Let Assumptions 1 and 2 hold. Then, the protocol in Equation (12) guarantees that $$\lim_{t\to\infty} x_i(t) = \bar{q}, \forall i \in \mathcal{N}_{p^-},$$

where $$\bar{q} = w_l^T q_0.$$

If, in addition, Assumption 3 holds and, $$\lim_{t\to\infty} \theta_i(t) = 0, \forall i \in \mathcal{N}_p,$$

then $$\lim_{t\to\infty} x_i(t) = \bar{q}, \forall i \in \mathcal{N}_p.$$

Corollary 3 can show that the static gain of the error dynamics of agents in $\mathcal{N}_p$ is still $1/d_{pi}$.

Corollary 3. If $\theta_i(t) \equiv \theta^*_i$ ($\theta^*_i$ is finite), $\forall i \in \mathcal{N}_p$ in Theorem 2, then $$\lim_{t\to\infty} x_i(t) = \overline{q} + (1/d_{pi})\theta^*_i, \ \forall \ i \in \mathcal{N}_p.$$

As it is shown in Theorem 2, Assumption 4 is not required anymore, and the order of protocols for agents in $\mathcal{N}_{p'}$ is reduced when the second protocol is used. Note also that by selecting the initial values of the reference consensus models for all agents 103 in $\mathcal{N}$, a desired consensus value $\overline{x}_r$ can be picked in the first protocol (although this consensus value selection provides flexibility, agents cannot achieve this value; see Corollary 2). However, this flexibility is lost in the second protocol since the consensus value $\overline{q}$ is also dependent on the initial values of the states of the agents 103 in $\mathcal{N}_p$.

Third Protocol.

The third protocol aims to present a protocol that provides both flexibility to choose a desired consensus value and capability to achieve this value as a global objective. For this purpose, the first protocol is now modified here by adding a damping term $(x_{ri}(t) - x_i(t))$ to each agent $i \in \mathcal{N}_p$, as $$u_i(t) = l_i(x_{ri}(t) - x_i(t)) + \sum_{j \in N_i} a_{ij}(x_{rj}(t) - x_{ri}(t)) + \quad (16)$$

$$k_i\left(\theta_i(t) + \sum_{j \in N_i \backslash N_p} a_{ij}(x_j(t) - x_i(t))\right),$$

where $l_i \in \mathbb{R}_{>0}$ if $i \in \mathcal{N}_{p'}$, $l_i = 0$ otherwise. Note that third protocol in Equation (16) uses the reference consensus model in Equation (6).

Inserting Equation (16) into Equation (1) and using Equation (6) together with Equation (9), the error dynamics of each agent can be expressed as $$\dot{\tilde{x}}_i(t) = k_i\left(\theta_i(t) + \sum_{j \in N_i \backslash N_p} a_{ij}(\tilde{x}_j(t) - \tilde{x}_i(t) + x_{rj}(t) - x_{ri}(t))\right), \quad (17)$$

$$- l_i \tilde{x}_i(t), \ \tilde{x}_i(0) = \tilde{x}_{i0}, \ t \geq 0.$$

The next theorem and corollary are now immediate.

Theorem 3. Let Assumptions 1 and 2 hold. Then, the protocol in Equation (16) guarantees that $$\lim_{t\to\infty} x_i(t) = x_r, \ \forall \ i \in \mathcal{N}_{p'}.$$

If, in addition, Assumption 3 holds and $$\lim_{t\to\infty} \theta_i(t) = 0, \ \forall \ i \in \mathcal{N}_p,$$

then $$\lim_{t\to\infty} x_i(t) = x_r, \ \forall \ i \in \mathcal{N}_p.$$

Corollary 4. If $\theta_i(t) \equiv \theta^*_i$ ($\theta^*_i$ is finite), $\forall i \in \mathcal{N}_p$ in Theorem 3, then $$\lim_{t\to\infty} x_i(t) = x_r + (1/d_{pi})\theta^*_i, \ \forall \ i \in \mathcal{N}_p.$$

Fourth Protocol.

The fourth protocol proposed builds on the second protocol and utilizes the damping term from the third protocol in such a way that Assumption 3 is not required to address the point that ii) agents that complete their local tasks still obey the global objective of the multiagent system 100. In particular, the last summation removed in Equation (12) and the damping term for the agents 103 in $\mathcal{N}_p$ is included as reference consensus models are available only for the agents 103 in $\mathcal{N}_p$. To this end, the fourth protocol is now given by $$u_i(t) = l_i(x_{ri}(t) - x_i(t)) + \sum_{j \in N_i} a_{ij}(q_j(t) - q_i(t)) + k_i\theta_i(t), \quad (18)$$

where $l_i \in \mathbb{R}_{>0}$ if $i \in \mathcal{N}_p$, $l_i = 0$ otherwise.

Next, inserting Equation (18) into Equation (1), each agent $i \in \mathcal{N}_p$ has the dynamics given in Equation (13). On the other hand, the error dynamics of each agent $i \in \mathcal{N}_p$ differs from Equation (14) as $$\dot{\tilde{x}}_i(t) = -l_i\tilde{x}_i(t) + k_i\theta_i(t), \tilde{x}_i(0) = \tilde{x}_{i0}, t \geq 0. \quad (19)$$

Theorem 4 now shows the two points addressed above: i) agents that perform their local objectives do not deteriorate the global objective of remaining agents and ii) agents that complete their local tasks still obey the global objective of the multiagent system 100, are addressed by implementing the fourth protocol.

Theorem 4. Let Assumptions 1 and 2 hold. Then, the protocol in Equation (18) guarantees that $$\lim_{t\to\infty} x_i(t) = \overline{q}, \ \forall \ i \in \mathcal{N}_{p'}.$$

If, in addition, $$\lim_{t\to\infty} \theta_i(t) = 0, \ \forall \ i \in \mathcal{N}_p,$$

then $$\lim_{t\to\infty} x_i(t) = \overline{q}, \ \forall \ i \in \mathcal{N}_p.$$

$\forall i \in \mathcal{N}_p$.

In contrast to the first three protocols, the static gain of the error dynamics of each agent 103 in $\mathcal{N}_p$ is independent of the graph topology (i.e., $d_{pi}$) and it is equal to 1 if $k_i = l_i$. If $\theta_i(t) \equiv \theta^*_i$ ($\theta^*_i$ is finite), $\forall i \in \mathcal{N}_p$ in Theorem 4, then $$\lim_{t\to\infty} x_i(t) = \overline{q} + (k_i/l_i)\theta^*_i, \ \forall \ i \in \mathcal{N}_p.$$

Corollary 5. If $\theta_i(t) \equiv \theta^*_i$ ($\theta^*_i$ is finite), $\forall i \in \mathcal{N}_p$ in Theorem 4, then $\lim_{t\to\infty} x_i(t) = \overline{q} + (k_i/l_i)\theta^*_i$, $\forall i \in \mathcal{N}_p$.

Fifth Protocol.

Another protocol is proposed that not only removes Assumption 3 but also provides the flexibility and the capability about the desired consensus value, which is achieved by the third protocol. Specifically, if the last summation is removed in Equation (16) and all agents 103 in $\mathcal{N}$ are allowed to use the damping term in Equation (16), the fifth protocol is expressed as $$u_i(t)=l_i(x_{ri}(t)-x_i(t))+\Sigma_{j\in N_i}a_{ij}(x_{rj}(t)-x_{ri}(t))+k_i\theta_i(t), \quad (20)$$

where $$l_i \in \mathbb{R}_{>0}$$

for all $i \in \mathcal{N}$. Inserting Equation (20) into Equation (1) and using Equation (6) together with Equation (9), the error dynamics of every agent 103 is expressed by Equation (19). The contribution of the fifth protocol is now presented in the following theorem and corollary.

Theorem 5. Let Assumptions 1 and 2 hold. Then, the protocol in Equation (20) guarantees that $$\lim_{t\to\infty} x_i(t) = x_r, \forall i \in \mathcal{N}_{p'}.$$

If, in addition, $$\lim_{t\to\infty} \theta_i(t) = 0, \forall i \in \mathcal{N}_p,$$

then $$\lim_{t\to\infty} x_i(t) = x_r, \forall i \in \mathcal{N}_p.$$

Corollary 6. If $\theta_i(t) \equiv \theta^*_i$ ($\theta^*_i$ is finite), $\forall i \in \mathcal{N}_p$ in Theorem 5, then $$\lim_{t\to\infty} x_i(t) = x_r + (k_i/l_i)\theta^*_i, \forall i \in \mathcal{N}_p.$$

The present disclosure relates to five protocols to ensure the harmony of the global and local objectives, where the benchmark consensus problem is used as the global objective. The differences between these protocols are highlighted by listing the available information types to each agent 103 in FIG. 3 and summarizing the assumptions behind these protocols and the properties that they offer in FIG. 4.

Figure 3:
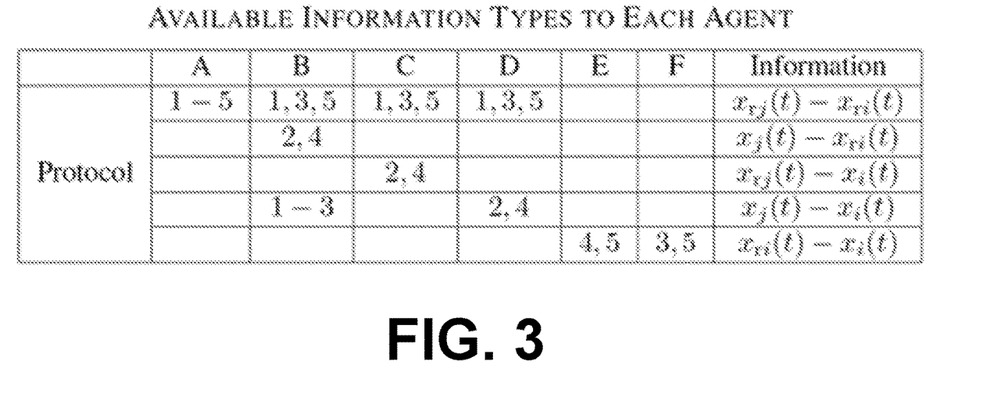
FIG. 3 illustrates a table that lists the available information types for agents in a multiagent system according to various embodiments.
Figure 4:
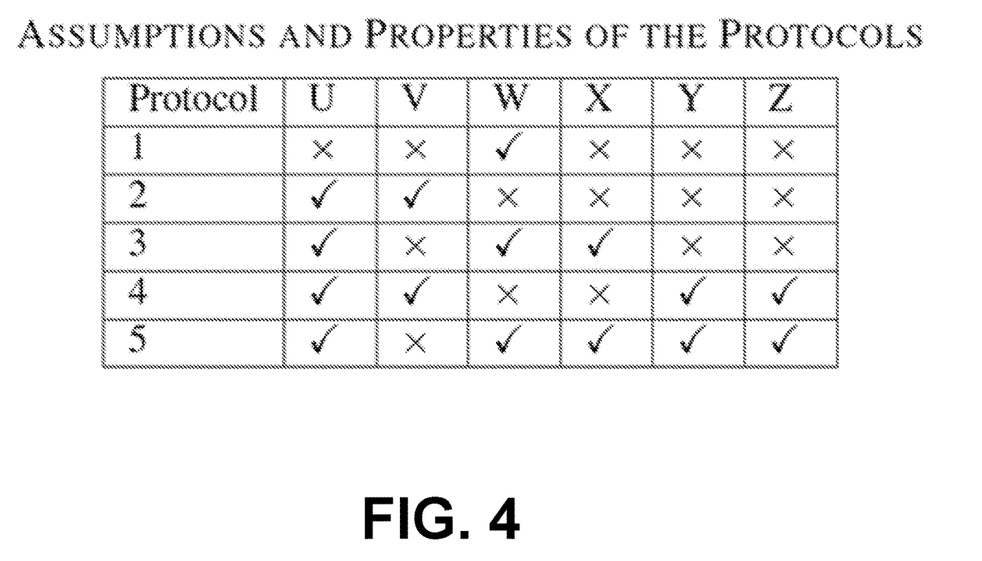
FIG. 4 illustrates a table that summarizes assumptions behind different control protocols and the properties the control protocols offer according to various embodiments.

To this end, the following cases are considered in FIG. 3: A denotes $i \in \mathcal{N}_p$ and $j \in N_i \setminus \mathcal{N}_{p'}$, B denotes $i \in \mathcal{N}_p$ and $j \in N_i \setminus \mathcal{N}_{p'}$, C denotes $i \in \mathcal{N}_{p'}$ and $j \in N_i \setminus \mathcal{N}_{p'}$, D denotes $i \in \mathcal{N}_{p'}$ and $j \in N_i \setminus \mathcal{N}_p$, E denotes $i \in \mathcal{N}_p$ without any neighbors, and F denotes $i \in \mathcal{N}_{p'}$ without any neighbors. In FIG. 3, in addition, U (respectively, Y) is for the cases when Assumption 4 (respectively, Assumption 3) is not required, V for the cases when the order of protocols for agents in $\mathcal{N}_{p'}$ reduces, W (respectively, X) when a protocol provides a flexibility (respectively, capability) to choose a (respectively, achieve the) desired consensus value, and Z for the cases when the static gain of the error dynamics of each agent 103 in $\mathcal{N}_p$ is independent of the graph topology ("✓" denotes "yes" and "×" denotes "no" in FIG. 4).

Proofs

The results included herein are valid for all initial conditions of the agents 103 given by Equation (1).

Proof of Lemma 2. Since $$\lim_{t\to\infty} f(t) = h,$$

for a given $\epsilon>0$, there exists $T>0$ such that $|f(t)-h|<\epsilon$, $t>T$. This implies that $f$ is bounded in $(T,\infty)$. Since $[0, T]$ is compact and $f$ is piecewise continuous on $[0, T]$, $f$ is bounded on $[0, T]$ by Proposition 2.18 in W. M. Haddad and V. Chellaboina, Nonlinear dynamical systems and contol: A Lyapunov-based approach. Princeton University Press, 2008 (hereinafter Haddad), which is hereby incorporated by reference in its entirety. Thus, the result follows.

Proof of Lemma 3. Since the system in Equation (4) is linear time-invariant and $-\alpha<0$, it is input-to-state stable. Since Equation (4) is input-to-state stable and $\eta(t)$ is piecewise continuous, $$\lim_{t\to\infty} \eta(t) = 0$$

implies that $$\lim_{t\to\infty} \hat{\xi}(t) = 0$$

(see, e.g., proof given after Definition 4.6 in Haddad).

Proof of Lemma 4. Define $\tilde{\xi}(t) \triangleq \xi(t)-\hat{\xi}(t)$. Then, Equations (4) and (5) yield the following dynamics $$\dot{\tilde{\xi}}=-\alpha\tilde{\xi}(t)+\omega(t),\tilde{\xi}(0)=\tilde{\xi}_0,t\geq 0. \quad (21)$$

Since $\omega(t)$ is piecewise continuous and $$\lim_{t\to\infty} \omega(t) = 0,$$

$\lim \tilde{\xi}(t) = 0$ by Lemma 3. This proves the first part of the lemma. Next, note that $\eta(t) \equiv \eta^*$ and define the following assistant state $$\hat{\xi}_a(t) \triangleq \hat{\xi}(t)-(\beta/\alpha)\eta^*. \quad (22)$$

Taking the time derivative of Equation (22), using Equation (4), and inserting $\hat{\xi}(t)=\hat{\xi}_a(t)+(\beta/\alpha)\eta^*$ into that equation, the result is $$\dot{\hat{\xi}}_a(t)=-\alpha\hat{\xi}_a(t),\hat{\xi}_a(0)=\hat{\xi}_{a0},t\geq 0. \quad (23)$$

Since $-\alpha<0$, the origin of Equation (23) is exponentially stable; hence, $$\lim_{t\to\infty} \hat{\xi}_a(t) = 0.$$

It implies that $$\lim_{t\to\infty} \hat{\xi}(t) = (\beta/\alpha)\eta^*.$$

Thus, the result follows from the first part of the lemma.
Proof of Theorem 1. Since Assumption 1 holds, $$\lim_{t\to\infty} x_{ri}(t) = x_r$$

for all $i \in \mathcal{N}$ by Lemma 1. If $i \in \mathcal{N}_{p'}$, the error dynamics in Equation (10) then reduces to the form given by $$\dot{\tilde{x}}_i(t) = 0, \tilde{x}_i(0) = \tilde{x}_{i0}, t \geq 0. \tag{24}$$

If $i \in \mathcal{N}_p$, the error dynamics of each agent 103 is exactly the same as the one in Equation (10). By Assumption 2, the error between the state of each agent 103 and the state of its corresponding reference consensus model evolves according to either Equation (24) or Equation (10).
First, consider the agents 103 in $\mathcal{N}_{p'}$. Then, Equation (24) implies that $\tilde{x}_i(t) = \tilde{x}_{i0}$ and $\tilde{x}_{i0} = 0$ by Assumption 4. Thus, $x_i(t) = x_{ri}(t)$, $t \geq 0$. This proves the first statement of the theorem.
Second, consider the agents 103 in $\mathcal{N}_p$. From the first part of the proof, $\tilde{x}_j(t) = 0$ for all $j \in \mathcal{N}_{p'}$. Using this fact and the definition of $d_{pi}$, Equation (10) can be rewritten as $$\dot{\tilde{x}}_i(t) = k_i d_{pi} \tilde{x}_i(t) + k_i \left( \theta_i(t) + \sum_{j \in N_i \setminus N_p} a_{ij}(x_{rj}(t) - x_{ri}(t)) \right), \tag{25}$$

$$\tilde{x}_i(0) = \tilde{x}_{i0}, t \geq 0.$$

Since $k_i > 0$ and Assumption 3

$$k_i d_{pi} > 0. \text{ Let } \mu_i(t) \triangleq \sum_{j \in N_i \setminus N_p} a_{ij}(x_{rj}(t) - x_{ri}(t)).$$

It has been shown that $$\lim_{t\to\infty} \mu_i(t) = 0$$

by Lemma 1. It is also noted that the solution of the linear time-invariant system in Equation (7) is continuous on $[0, \infty)$, so is $x_{ri}(t)$ for all $i \in \mathcal{N}$. Thus, $\mu_i(t)$ is continuous. Furthermore, $\theta_i(t)$ is piecewise continuous, $$\lim_{t\to\infty} \theta_i(t) = 0, (\theta_i(t) + \mu_i(t))$$

is piecewise continuous, and $$\lim_{t\to\infty} (\theta_i(t) + \mu_i(t)) = 0.$$

Lemma 3 is applicable and it implies that $$\lim_{t\to\infty} \tilde{x}_i(t) = 0.$$

Hence, proof of the second statement follows.
Proof of Corollary 1. By applying Lemma 4 to Equation (25), the result is $$\lim_{t\to\infty} \tilde{x}_i(t) = \left(\frac{1}{d_{pi}}\right)\theta_i^*.$$

Recalling $$\lim_{t\to\infty} x_{ri}(t) = x_r,$$

the result follows. Corollaries 3-6 follow the same procedure.
Proof of Corollary 2. In this analysis, the changes in the proof of Theorem 1 are highlighted. First, consider the agents in $\mathcal{N}_{p'}$; since Assumption 4 is not considered in this corollary, $x_i(t) = x_{ri}(t) + \tilde{x}_{i0}$, $t \geq 0$. This shows the first statement. Second, consider the agents 103 in $\mathcal{N}_p$. It is known from the first part of the proof that $\tilde{x}_j(t) = \tilde{x}_{j0}$ for all $j \in \mathcal{N}_{p'}$. In this case, instead of Equation (25), the error dynamics are $$\dot{\tilde{x}}_i(t) = -k_i d_{pi} \tilde{x}_i(t) + k_i \left( \theta_i(t) + \mu_i(t) + \sum_{j \in N_i \setminus N_p} a_{ij} \tilde{x}_{j0} \right), \tag{26}$$

$$\tilde{x}_i(0) = \tilde{x}_{i0}, t \geq 0.$$

Since the last summation in the right hand side of Equation (26) is constant, $$\lim_{t\to\infty} \tilde{x}_i(t) = (1/d_{pi}) \sum_{j \in N_i \setminus N_p} a_{ij} \tilde{x}_{j0}$$

by Lemma 4. Hence, the second statement follows.
Proof of Theorem 2. Since Assumption 1 holds, $$\lim_{t\to\infty} q_i(t) = \bar{q} \text{ for all } i \in \mathcal{N}$$

by Lemma 1. That is, $$\lim_{t\to\infty} x_{ri}(t) = \bar{q} \text{ for all } i \in \mathcal{N}_P$$

and $$\lim_{t\to\infty} x_i(t) = \bar{q} \text{ for all } i \in \mathcal{N}_{p'}.$$

This proves the first statement. Next, consider the error dynamics of the agents 103 in $\mathcal{N}_p$. Using the definition of $1/d_{pi}$, Equation (14) can be expressed as $$\dot{\tilde{x}}_i(t) = -k_i d_{pi}\tilde{x}_i(t) + k_i\left(\theta_i(t) + \sum_{j\in N_i\backslash N_p} a_{ij}(q_j(t)-q_i(t))\right), \quad (27)$$

$$\tilde{x}_i(0) = \tilde{x}_{i0}, t \geq 0.$$

Let $$v_i(t) \triangleq \sum_{j\in N_i\backslash N_p} a_{ij}(q_j(t)-q_i(t)).$$

It can be observed that $$\lim_{t\to\infty} v_i(t) = 0$$

and $v_i(t)$ is continuous by the same argument for $\mu_i(t)$ in the proof of Theorem 1. Hence, the rest of the proof follows from the proof of Theorem 1 by comparing Equation (27) with Equation (25).

Proof of Theorem 3. For brevity, the changes in the proof of Theorem 1 are focused on. If $i\in \mathcal{N}_p$, the error dynamics given by Equation (17) becomes $$\dot{\tilde{x}}_i(t)=-l_i\tilde{x}_i(t),\tilde{x}_i(0)=\tilde{x}_{i0}, t\geq 0. \quad (28)$$

If $i\in \mathcal{N}_p$, then the error dynamics of each agent 103 is exactly the same as the one in Equation (10). First, consider the agents in $\mathcal{N}_p$. Since $-l_i<0$, the origin of Equation (28) is exponentially stable; hence, $$\lim_{t\to\infty} \tilde{x}_i(t) = 0.$$

Thus, the first statement follows. Second, consider the agents 103 in $\mathcal{N}_p$. In place of Equation (25), the error dynamics are as follows:

$$\dot{\tilde{x}}_i(t) = -k_i d_{pi}\tilde{x}_i(t) + k_i\left(\theta_i(t) + \mu_i(t) + \sum_{j\in N_i\backslash N_p} a_{ij}\tilde{x}_j(t)\right),$$

$$\tilde{x}_i(0) = \tilde{x}_{i0}, t \geq 0.$$

Let $p(t) \triangleq \Sigma_{j\in N_i\backslash} \mathcal{N}_p a_{ij}\tilde{x}_j(t)$. From the first part of the proof, $$\lim_{t\to\infty} p(t) = 0 \text{ and } p(t)$$

is clearly continuous. Hence, the rest of the proof can be completed by following the similar steps in the proof of Theorem 1.

Proof of Theorem 4. The first statement follows from the proof of Theorem 2. Now, consider the error dynamics of each agent $i\in \mathcal{N}_p$ given by Equation (19). Under the given assumptions, $$\lim_{t\to\infty} \tilde{x}_i(t) = 0$$

by Lemma 3. Then, recalling $$\lim_{t\to\infty} x_{ri}(t) = \overline{q}$$

from the proof of Theorem 2, the second statement follows.

Proof of Theorem 5. Notice that the error dynamics of each agent 103 $i\in \mathcal{N}_p$, (respectively, $i\in \mathcal{N}_p$) is given in Equation (28) (respectively, Equation (19)). Note also that $$\lim_{t\to\infty} x_{ri}(t) = x_r$$

for all $i\in \mathcal{N}$. Therefore, the first and the second statement follow from the proofs of Theorem 3 and Theorem 4, respectively.

Computing Device

Figure 5:
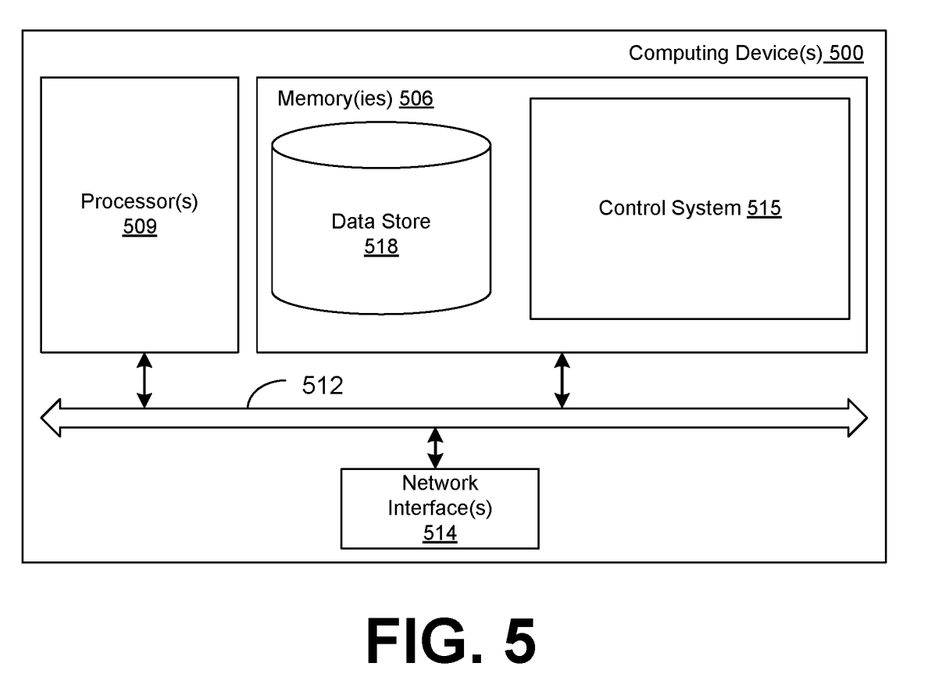
FIG. 5 is a schematic block diagram that illustrates an example control system employed in the multiagent system of FIG. 1 according to various embodiments.

FIG. 5 shows a schematic block diagram of a computing device 500 employed in each agent of the present disclosure. Each computing device 500 includes at least one processor circuit, for example, having a processor 509 and a memory 509, both of which are coupled to a local interface 512. The local interface 512 may comprise, for example, a data bus with an accompanying address/control bus or other bus structure as can be appreciated.

In some embodiments, the computing device 500 can include one or more network interfaces 514. The network interface 514 may comprise, for example, a wireless transmitter, a wireless transceiver, and/or a wireless receiver. The network interface 514 can communicate to a remote computing device, a ground station, a neighboring agent, and/or other components of the disclosed system using a Bluetooth, WiFi, or other appropriate wireless protocol. As one skilled in the art can appreciate, other wireless protocols may be used in the various embodiments of the present disclosure.

Stored in the memory 506 are both data and several components that are executable by the processor 509. In particular, stored in the memory 506 and executable by the processor 509 can be a control system 515, and potentially other applications. In this respect, the term "executable" means a program file that is in a form that can ultimately be run by the processor 509. The control system 515 is configured to implement the control discussed herein related to multiagent systems 100 with local and global objectives. Also stored in the memory 506 may be a data store 518 and other data. In addition, an operating system may be stored in the memory 506 and executable by the processor 509. It is understood that there may be other applications that are stored in the memory 506 and are executable by the processor 509 as can be appreciated.

Examples of executable programs may be, for example, a compiled program that can be translated into machine code in a format that can be loaded into a random access portion of the memory 506 and run by the processor 509, source code that may be expressed in proper format such as object code that is capable of being loaded into a random access portion of the memory 506 and executed by the processor 509, or source code that may be interpreted by another executable program to generate instructions in a random access portion of the memory 506 to be executed by the processor 509, etc. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 509 may represent multiple processors 509 and/or multiple processor cores, and the memory 506 may represent multiple memories 506 that operate in parallel processing circuits, respectively. In such a case, the local interface 512 may be an appropriate network that facilitates communication between any two of the multiple processors 509, between any processor 509 and any of the memories 506, or between any two of the memories 506, etc. The local interface 512 may comprise additional systems designed to coordinate this communication, including, for example, performing load balancing. The processor 509 may be of electrical or of some other available construction.

Although the control system 515, and other various applications described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the control system 215, that comprises software or code can be embodied in any non-transitory computer-readable medium for use by or in connection with an instruction execution system such as, for example, a processor 509 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the control system 515, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 203, or in multiple computing devices in the same computing environment. To this end, each computing device 500 may comprise, for example, at least one server computer or like device, which can be utilized in a cloud based environment.

Additional aspects of the present disclosure can be better understood with reference to Sarsilmaz et al., Control of Multiagent Systems with Local and Global Objectives, IEEE Conference on Decision and Control, 2018, which is hereby incorporated by reference in its entirety.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to cy'" includes "about 'x' to about y".

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A system, comprising:
   a communication network; and
   a plurality of agents being in communication with one another via the communication network, the plurality of agents being configured to perform a global objective, and a subset of the plurality of agents being configured to perform a local objective without deteriorating performance of the global objective by the plurality of agents, wherein performance of the global objective by the plurality of agents and performance of the local objective by the subset are based upon a defined set of protocols comprising:
   a first protocol given by:

$$u_i(t) = \Sigma_{j \in N_i} a_{ij}(x_{rj}(t) - x_{ri}(t)) + k_i(\theta_i(t) + \Sigma_{j \in N_i} \mathcal{N}_p a_{ij}(x_j(t) - x_i(t))),$$

$$\dot{x}_{ri}(t) = \Sigma_{j \in N_i} a_{ij}(x_{rj}(t) - x_{ri}(t)), x_{ri}(0) = x_{ri0}, t \geq 0,$$

where $N_i$ denotes a set of neighbors of an agent $v_i$ in the plurality of agents and $\mathcal{N}_p$ denotes a set of agents of the plurality of agents that can be assigned to local tasks, $u_i$ is an input of agent $v_i$, $x_i$ is an agent state of agent $v_i$, $x_{ri}$ is a reference consensus model state of agent $v_i$, $a_{ij}$ is an element of an adjacency matrix, $\theta_i$ is an input used to assign local tasks, and $k_i \in \mathbb{R}_{>0}$ if $i \in \mathcal{N}_p$, $k_i = 0$ otherwise;
   a second protocol given by:

$$u_i(t) = \Sigma_{j \in N_i} a_{ij}(q_j(t) - q_i(t)) + k_i(\theta_i(t) + \Sigma_{j \in N_i} \mathcal{N}_p a_{ij}(x_j(t) - x_i(t))),$$

$$\dot{x}_{ri}(t) = \Sigma_{j \in N_i} a_{ij}(q_j(t) - x_{ri}(t)), x_{ri}(0) = x_{ri0}, t \geq 0,$$

where $q(t) = [q_1(t), \ldots, q_N(t)]^T \triangleq [x_{r1}(t), \ldots, x_{rp}(t), x_{p+1}(t), \ldots, x_N(t)]^T$ with $x_{r1}, \ldots, x_{rp}$ being reference consensus model states for agents in $\mathcal{N}_p$ and $x_{p+1}, \ldots, x_N$ being agent states of agents in $\mathcal{N}_{p'}$, $\mathcal{N}_p$ denotes a set of agents of the plurality of agents that can be assigned to local tasks, and $\mathcal{N}_{p'}$ denotes a set of agents of the plurality of agents that cannot be assigned to local tasks;
   a third protocol given by:

$$u_i(t) = l_i(x_{ri}(t) - x_i(t)) + \Sigma_{j \in N_i} a_{ij}(x_{rj}(t) - x_{ri}(t)) + k_i(\theta_i(t) + \Sigma_{j \in N_i, 903} p a_{ij}(x_j(t) - x_i(t))),$$

$$\dot{x}_{ri}(t) = \Sigma_{j \in N_i} a_{ij}(x_{rj}(t) - x_{ri}(t)), x_{ri}(0) = x_{ri0}, t \geq 0,$$

where $l_i \in \mathbb{R}_{>0}$ if $i \in \mathcal{N}_p$, $l_i = 0$ otherwise;
   a fourth protocol given by:

$$u_i(t) = l_i(x_{ri}(t) - x_i(t)) + \Sigma_{j \in N_i} a_{ij}(q_j(t) - q_i(t)) + k_i \theta_i(t),$$

$$\dot{x}_{ri}(t) = \Sigma_{j \in N_i} a_{ij}(q_j(t) - q_i(t)) = \Sigma_{j \in N_i} a_{ij}(q_j(t) - x_{ri}(t)), x_{ri}(0) = x_{ri0}, t \geq 0,$$

where $l_i \in \mathbb{R}_{>0}$ if $i \in \mathcal{N}_p$, $l_i = 0$ otherwise; and
   a fifth protocol given by:

$$u_i(t) = l_i(x_{ri}(t) - x_i(t)) + \Sigma_{j \in N_i} a_{ij}(x_{rj}(t) - x_{ri}(t)) + k_i \theta_i(t),$$

$$\dot{x}_{ri}(t) = \Sigma_{j \in N_i} a_{ij}(x_{rj}(t) - x_{ri}(t)), x_{ri}(0) = x_{ri0}, t \geq 0,$$

where $l_i \in \mathbb{R}_{>0}$ for all $i \in \mathcal{N}$;
wherein individual agents in the subset of agents have access to a relative state error for the first through fourth protocols.

2. The system of claim 1, wherein the plurality of agents comprise a plurality of single integrated agents.

3. The system of claim 1, wherein performance of the local objective complies with performance of the global objective.

4. The system of claim 1, wherein the plurality of agents are configured to exchange internal state information with each other.

5. The system of claim 1, wherein control of each agent in the plurality of agents is based at least in part on a reference consensus model corresponding to that agent.

6. The system of claim 1, wherein a reference consensus value for a reference consensus model is selected by an operator of the system for the first, third and fifth protocols.

7. The system of claim 1, wherein the plurality of agents comprise at least one of an aerial vehicle, a ground vehicle, an autonomous vehicle, an electrical vehicle, a power system in an industrial process control environment.

8. The system of claim 1, wherein a static gain of error dynamics for each agent in the subset of agents is independent of a graph topology of the communication network for the fourth and fifth protocols.

9. The system of claim 1, wherein a graph topology of the communication network comprises a spanning tree.

10. A multiagent system, comprising:
   a communication network being based on a spanning tree graph topology; and
   a plurality of agents in communication via the communication network, each agent of the plurality of agents comprising:
      at least one computing device; and
      a control system executable by the at least one computing device wherein when executed, the control system causes the at least one computing device to at least:
      perform a global objective; and
      perform a local objective while obeying the global objective;
   wherein performance of the global objective by the plurality of agents and performance of a first local objective by a first subset of the plurality of agents are based upon a defined set of protocols comprising:
   a first protocol given by:

$$u_i(t) = \Sigma_{j \in N_i} a_{ij}(x_{rj}(t) - x_{ri}(t)) + k_i(\theta_i(t) + \Sigma_{j \in N_i} \mathcal{N}_p a_{ij}(x_j(t) - x_i(t))),$$

$$\dot{x}_{ri}(t) = \Sigma_{j \in N_i} a_{ij}(x_{rj}(t) - x_{ri}(t)), x_{ri}(0) = x_{ri0}, t \geq 0,$$

where $N_i$ denotes a set of neighbors of an agent $v_i$ in the plurality of agents and $\mathcal{N}_p$ denotes a set of agents of the plurality of agents that can be assigned to local tasks, $u_i$ is an input of agent $v_i$, $x_i$ is an agent state of agent $v_i$, $x_{ri}$ is a reference consensus model state of agent $v_i$, $a_{ij}$ is an element of an adjacency matrix, $\theta_i$ is an input used to assign local tasks, and $k_i \in \mathbb{R}_{>0}$ if $i \in \mathcal{N}_p$, $k_i = 0$ otherwise;
   a second protocol given by:

$$u_i(t) = \Sigma_{j \in N_i} a_{ij}(q_j(t) - q_i(t)) + k_i(\theta_i(t) + \Sigma_{j \in N_i} \mathcal{N}_p a_{ij}(x_j(t) - x_i(t))),$$

$$\dot{x}_{ri}(t) = \Sigma_{j \in N_i} a_{ij}(q_j(t) - x_{ri}(t)), x_{ri}(0) = x_{ri0}, t \geq 0,$$

where $q(t) = [q_1(t), \ldots, q_N(t)]^T \triangleq [x_{r1}(t), \ldots, x_{rp}(t), x_{p+1}(t), \ldots, x_N(t)]^T$ with $x_{r1}, \ldots, x_{rp}$ being reference consensus model states for agents in $\mathcal{N}_p$ and $x_{p+1}, \ldots, x_N$ being agent states of agents in $\mathcal{N}_{p'}$, $\mathcal{N}_p$ denotes a set of agents of the plurality of agents that can be assigned to local tasks, and $\mathcal{N}_{p'}$ denotes a set of agents of the plurality of agents that cannot be assigned to local tasks;

a third protocol given by:

$$u_i(t)=l_i(x_{ri}(t)-x_i(t))+\Sigma_{j\in N_i}a_{ij}(x_{rj}(t)-x_{ri}(t))+k_i(\theta_i(t)+\Sigma_{j\in N_i\backslash z,903}\,_p a_{ij}(x_j(t)-x_i(t))),$$

$$\dot{x}_{ri}(t)=\Sigma_{j\in N_i}a_{ij}(x_{rj}(t)-x_{ri}(t)), x_{ri}(0)=x_{ri0}, t\geq 0,$$

where $l_i \in \mathbb{R}_{>0}$ if $i \in \mathcal{N}_{p'}$, $l_i=0$ otherwise;

a fourth protocol given by:

$$u_i(t)=l_i(x_{ri}(t)-x_i(t))+\Sigma_{j\in N_i}a_{ij}(q_j(t)-q_i(t))+k_i\theta_i(t),$$

$$\dot{x}_{ri}(t)=\Sigma_{j\in N_i}a_{ij}(q_j(t)-q_i(t))=\Sigma_{j\in N_i}a_{ij}(q_j(t)-x_{ri}(t)), x_{ri}(0)=x_{ri0}, t\geq 0,$$

where $l_i \in \mathbb{R}_{>0}$ if $i \in \mathcal{N}_{p'}$, $l_i=0$ otherwise; and a fifth protocol given by:

$$u_i(t)=l_i(x_{ri}(t)-x_i(t))+\Sigma_{j\in N_i}a_{ij}(x_{rj}(t)-x_{ri}(t))+k_i\theta_i(t),$$

$$\dot{x}_{ri}(t)=\Sigma_{j\in N_i}a_{ij}(x_{rj}(t)-x_{ri}(t)), x_{ri}(0)=x_{ri0}, t\geq 0,$$

where $l_i \in \mathbb{R}_{>0}$ for all $i \in \mathcal{N}$.

11. The multiagent system of claim 10, wherein a subset of the plurality of agents perform a local objective in addition to the global objective based upon the defined set of protocols.

12. The multiagent system of claim 11, wherein the subset of agents perform the local objective without deteriorating the global objective performed by the plurality of agents.

13. The multiagent system of claim 10, wherein, when executed, the control system causes the at least one computing device to at least exchange information with at least one of the plurality of agents.

14. The multiagent system of claim 10, wherein the plurality of agents comprise at least one of an aerial vehicle, a ground vehicle, an autonomous vehicle, an electrical vehicle, a power system in an industrial process control environment.

15. The multiagent system of claim 10, wherein control of each agent in the plurality of agents is based at least in part on a reference consensus model corresponding to that agent.

16. A method, comprising:
performing, via a plurality of agents, a global objective, wherein control of individual agents of the plurality of agents is based at least in part on a reference consensus model corresponding to that agent;
simultaneously to performing the global objective, performing, via at least a subset of the plurality of agents, at least one local objective in addition to the global objective, wherein performance of the global objective by the plurality of agents and performance of the at least one local objective by the subset of the plurality of agents are based upon a defined set of protocols comprising:

a first protocol given by:

$$u_i(t)=\Sigma_{j\in N_i}a_{ij}(x_{rj}(t)-x_{ri}(t))+k_i(\theta_i(t)+\Sigma_{j\in N_i\backslash}\mathcal{N}_p a_{ij}(x_j(t)-x_i(t))),$$

$$\dot{x}_{ri}(t)=\Sigma_{j\in N_i}a_{ij}(x_{rj}(t)-x_{ri}(t)), x_{ri}(0)=x_{ri0}, t\geq 0,$$

where $N_i$ denotes a set of neighbors of an agent $v_i$ in the plurality of agents and $\mathcal{N}_p$ denotes a set of agents of the plurality of agents that can be assigned to local tasks, $u_i$ is an input of agent $v_i$, $x_i$ is an agent state of agent $v_i$, $x_{ri}$ is a reference consensus model state of agent $v_i$, $a_{ij}$ is an element of an adjacency matrix, $\theta_i$ is an input used to assign local tasks, and $k_i \in \mathbb{R}_{>0}$ if $i \in \mathcal{N}_p$, $k_i=0$ otherwise;

a second protocol given by:

$$u_i(t)=\Sigma_{j\in N_i}a_{ij}(q_j(t)-q_i(t))+k_i(\theta_i(t)+\Sigma_{j\in N_i\backslash}\mathcal{N}_p a_{ij}(x_j(t)-x_i(t))),$$

$$\dot{x}_{ri}(t)=\Sigma_{j\in N_i}a_{ij}(q_j(t)-x_{ri}(t)), x_{ri}(0)=x_{ri0}, t\geq 0,$$

where $q(t)=[q_1(t), \ldots, q_N(t)]^T \triangleq [x_{r1}(t), \ldots, x_{rp}(t), x_{p+1}(t), \ldots, x_N(t)]^T$ with $x_{r1}, \ldots, x_{rp}$ being reference consensus model states for agents in $\mathcal{N}_p$ and $x_{p+1}, \ldots, x_N$ being agent states of agents in $\mathcal{N}_{p'}$, $\mathcal{N}_p$ denotes a set of agents of the plurality of agents that can be assigned to local tasks, and $\mathcal{N}_{p'}$ denotes a set of agents of the plurality of agents that cannot be assigned to local tasks;

a third protocol given by:

$$u_i(t)=l_i(x_{ri}(t)-x_i(t))+\Sigma_{j\in N_i}a_{ij}(x_{rj}(t)-x_{ri}(t))+k_i(\theta_i(t)+\Sigma_{j\in N_i\backslash z,903}\,_p a_{ij}(x_j(t)-x_i(t))),$$

$$\dot{x}_{ri}(t)=\Sigma_{j\in N_i}a_{ij}(x_{rj}(t)-x_{ri}(t)), x_{ri}(0)=x_{ri0}, t\geq 0,$$

where $l_i \in \mathbb{R}_{>0}$ if $i \in \mathcal{N}_{p'}$, $l_i=0$ otherwise;

a fourth protocol given by:

$$u_i(t)=l_i(x_{ri}(t)-x_i(t))+\Sigma_{j\in N_i}a_{ij}(q_j(t)-q_i(t))+k_i\theta_i(t),$$

$$\dot{x}_{ri}(t)=\Sigma_{j\in N_i}a_{ij}(q_j(t)-q_i(t))=\Sigma_{j\in N_i}a_{ij}(q_j(t)-x_{ri}(t)), x_{ri}(0)=x_{ri0}, t\geq 0,$$

where $l_i \in \mathbb{R}_{>0}$ if $i \in \mathcal{N}_{p'}$, $l_i=0$ otherwise; and a fifth protocol given by:

$$u_i(t)=l_i(x_{ri}(t)-x_i(t))+\Sigma_{j\in N_i}a_{ij}(x_{rj}(t)-x_{ri}(t))+k_i\theta_i(t),$$

$$\dot{x}_{ri}(t)=\Sigma_{j\in N_i}a_{ij}(x_{rj}(t)-x_{ri}(t)), x_{ri}(0)=x_{ri0}, t\geq 0,$$

where $l_i \in \mathbb{R}_{>0}$ for all $i \in \mathcal{N}$; and communicating, via a communication network, between the plurality of agents.

17. The method of claim 16, wherein performance of the at least one local objective complies with the global objective.

18. The method of claim 16, wherein communicating between the plurality of agents comprises exchanging internal state information.

19. The method of claim 16, wherein the subset of agents perform the at least one local objective without deteriorating the global objective performed by the plurality of agents.

20. The method of claim 16, wherein a static gain of error dynamics for each agent in the subset of agents is independent of a graph topology of the communication network.

* * * * *